United States Patent [19]

Marincic et al.

[11] Patent Number: 4,662,065
[45] Date of Patent: May 5, 1987

[54] METHOD FOR DEHYDRATING MANGANESE DIOXIDE

[75] Inventors: Nikola Marincic, Winchester; Radek Fuksa, Boston, both of Mass.

[73] Assignee: Battery Engineering, Inc., Hyde Park, Mass.

[21] Appl. No.: 866,160

[22] Filed: May 22, 1986

[51] Int. Cl.$^4$ .............................................. H01M 6/14
[52] U.S. Cl. ................................. 29/623.1; 429/224; 429/194; 423/49; 423/605
[58] Field of Search ................... 423/49, 605; 429/224; 29/623.1; 203/12, 50

[56] References Cited

U.S. PATENT DOCUMENTS

| | | | |
|---|---|---|---|
| 3,927,046 | 12/1975 | van der Broek et al. | 260/397.3 |
| 4,264,689 | 4/1981 | Moses | 29/623.1 |
| 4,401,641 | 8/1983 | Albizzati et al. | 423/498 |
| 4,408,077 | 10/1983 | Sestanj et al. | 568/441 |
| 4,499,310 | 2/1985 | Fung et al. | 568/634 |
| 4,608,753 | 9/1986 | Flerscher | 29/623.1 |

FOREIGN PATENT DOCUMENTS

| | | | |
|---|---|---|---|
| 0026890 | 8/1973 | Japan | 429/224 |
| 0086161 | 5/1984 | Japan | 429/224 |

Primary Examiner—Brian E. Hearn
Assistant Examiner—Steven P. Marquis
Attorney, Agent, or Firm—Pahl, Lorusso & Loud

[57] ABSTRACT

Method for the reactive dehydration of manganese dioxide. Dehydration is achieved by contact with a fluid desiccant (dehydrating agent) which reacts with water bound to manganese dioxide. Preferably, a gaseous product or a low boiling point liquid which easily produces vapors is formed. The manganese dioxide is then removed from the fluid desiccant and any adhering dessicant fluid and volatile reaction products are removed from the manganese dioxide under vacuum. Especially preferred for use as the dehydrating agent is thionyl chloride. The present invention is particularly suitable for dehydrating manganese dioxide to be used as electrodes in lithium batteries.

12 Claims, 3 Drawing Figures

METHOD FOR DEHYDRATING MANGANESE DIOXIDE

BACKGROUND OF THE INVENTION

This invention relates to a method for the reactive dehydrating of manganese dioxide and the application of that technique to prepare manganese dioxide electrodes completely free of water for use in lithium batteries.

There has long been a need for high power density batteries, those having high ionic conductivity electrolytes, resulting in low internal resistance, low viscosity and stability with respect to the electrodes. Lithium batteries have met that need to a certain degree.

These batteries, however, present certain problems because of the high reactivity of lithium with water. The presence of any water in the cell with lithium results in the corrosion of the lithium and raises the possibility of the cell overheating, rupturing or even exploding. Certain measures have alleviated that problem somewhat. Non-aqueous electrolytes are often used with batteries of this type. Precautions are taken to dry all cell components thoroughly before they are to be assembled in the cell. Further, components are assembled in an anhydrous environment to ensure that they are not recontaminated by the moisture found in room atmosphere.

Manganese dioxide has been used for a long time as an active cathode material in alkaline dry batteries. In the 1970's, it was established that the lithium cell could be put into practical use by employing almost anhydrous manganese dioxide as cathode material for non-aqueous lithium cells. Because of its physical, chemical and electrical properties, the manganese dioxide has great oxidizing power and therefore high depolarizing characteristics. These characteristics make it an excellent choice for high performance dry batteries.

Commercially available, manganese dioxide, however, is not a completely dry material. In the past, a heat treatment has been used to remove the combined water (water of crystallization). This heat treatment is done in air or in a vacuum at various temperatures for as long as a day or longer. The heat treatment must be done at a minimum of 250° C. but it is generally hypothesized that all water, both adherent and combined, is not removed until a temperature of 750° C. is reached. Yet, for practical considerations, it was felt that the presence of a little water was unavoidable when manganese dioxide was used, because it was bound in the crystal structure. Its presence can even be detected on X-ray diffraction indices. It was felt that because the water was bound in the crystal structure, it would have no effect on storage characteristics. However, lithium-manganese dioxide batteries, despite their excellent short term performance, have not performed as expected because they have not demonstrated stability in storage.

SUMMARY OF THE INVENTION

The present invention is a method for the reactive dehydration of manganese dioxide. According to this method, manganese dioxide is prepared in a shaped form and soaked in a fluid desiccant (dehydrating agent) which reacts with the water bound to the manganese dioxide. The bound water is believed to be in the crystal structure, i.e., as water of crystallization. Preferably, the desiccant is of a nature that reacts with water to produce a gas and/or a highly volatile reaction product.

The shaped mass of manganese dioxide is then removed from the fluid desiccant. The gas or volatile reaction product and any adhering unreacted drying component are then removed from the manganese dioxide under vacuum. The preferred desiccant is thionyl chloride which reacts with water to form HCl and sulfur dioxide ($SO_2$). The thionyl chloride may be a conventional lithium cell electrolyte containing dissolved aluminum chloride or aluminum-lithium chloride solutes which are well known for their desiccating properties.

In one most important use for this method, completely dry manganese dioxide is utilized as active cathode material in lithium non-aqueous batteries. In most cases, the dehydration process is conducted as a preparation process for the electrode outside of the cell. In some situations, the dehydration may be conducted in the cell. The use of this chemical drying technique removes any chance of contamination of the lithium cell with water.

DETAILED DESCRIPTION OF THE INVENTION

Figure 1:
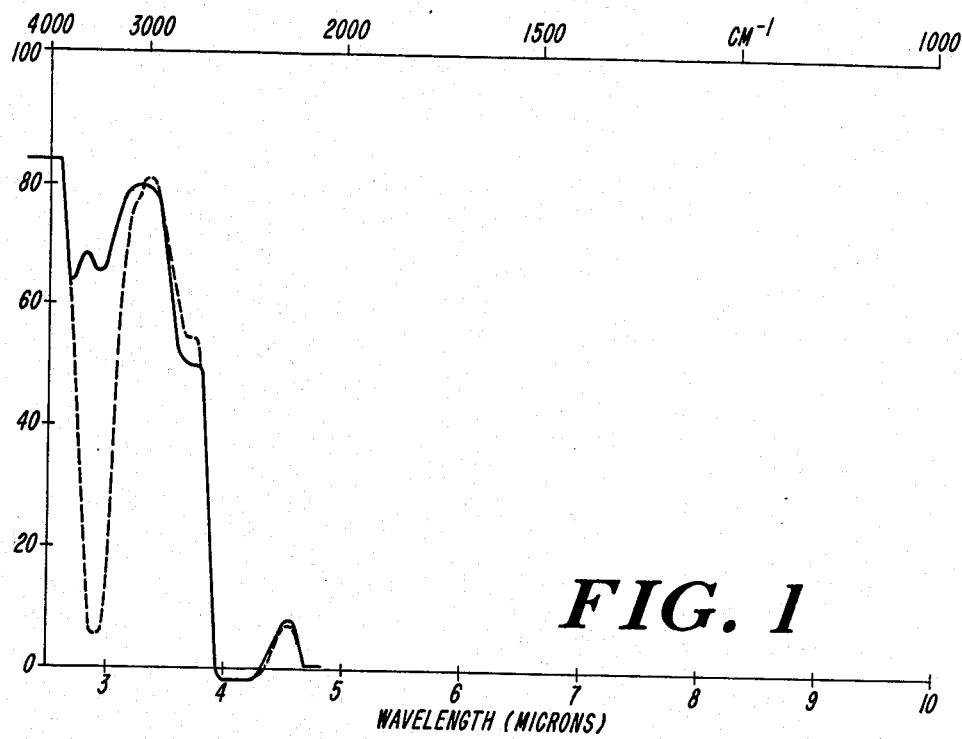
FIG. 1 shows infrared spectra for a conventional electrolyte before and after contact with a manganese dioxide/carbon electrode as in the method of the present invention.

According to the method of the present invention, manganese dioxide is chemically dried by contacting it with a liquid or gas desiccant which reacts with bound water in the manganese dioxide (water of crystallization) to form an easily removable reaction product.

It should be pointed out that the method of the present invention is a method for dehydrating manganese dioxide. This invention will have application in many areas and can be used in any situation where dehydrated manganese dioxide is desired. The method of the present invention will be described herein with reference to one preferred use of the method, that is, as a method to dehydrate manganese dioxide which will be used as an electrode in a lithium battery. However, this preferred use is merely illustrative and should not be considered as limiting.

An electrode is prepared by shaping a mixture of $MnO_2$ and carbon in a conventional manner, for example, by extrusion. The electrode is soaked in a liquid or gas which preferably reacts with the bound water to produce a gas or low boiling (highly volatile) liquid which is easily extracted from the electrode under vacuum.

Suitable fluid desiccants which react with the bound water include liquid desiccants such as the oxyhalides, inclusive of thionyl chloride, sulfuryl chloride, phosphorus oxychloride and selenium oxychloride, and anhydrous solvent solutions of desiccants which are solid at room temperature such as $LiAlCl_4$, $AlCl_3$, $LiCl$, etc.

Suitable solvents for such anhydrous salt solutions include tetrahydrofuran (THF) and its derivatives, acetonitrile, thionyl chloride, liquid $SO_2$ and propylene carbonate. The preferred desiccant is a conventional lithium battery electrolyte and most preferably is a thionyl chloride solution of an aluminum salt. Such a solution will typically have a 0.8–1.8 molar concentration of the solute salt, e.g. $AlCl_3$ or $LiAlCl_4$. In the case of a thionyl chloride solution of $AlCl_3$ or $LiAlCl_4$, both solvent and solute are desiccants. The thionyl chloride reacts with water to form $SO_2$ and HCl, both of which can relatively easily be removed from the porous structure of a manganese dioxide/carbon electrode under vacuum.

The manganese dioxide to be dehydrated is first contacted with the fluid desiccant, e.g., by soaking in a bath of liquid desiccant. The duration of the soak and the temperature of the bath will vary widely, depending on the nature of the desiccant. In the case of thionyl chloride the soak need last but a few minutes at room temperature. If the boiling point of the fluid desiccant and apparatus permit, the fluid bath may be heated to speed the reaction with water.

The extractable reaction product formed in accordance with the present invention would be, for example, the combination of HCl and $SO_2$ in the case of thionyl chloride and a complex of water and the aluminum salt in the case of an aluminum salt. The desiccant provides a reaction product that is extractable from the manganese dioxide by use of a suitable solvent which may be present in the fluid desiccant itself or which may be used as a second soak. Preferably the reaction product will be a gas, as with the use of thionyl chloride, or a highly volatile liquid.

After removal from the soaking bath, excess liquid is allowed to drain from the electrode by dripping. Any volatile desiccant or gaseous and volatile reaction products remaining in the porous structure of the electrode are then removed therefrom by vacuum. For this purpose the electrode is placed in a conventional heremetically sealable container connected to a conventional vacuum pump. The degree of vacuum is relatively unimportant other than for the fact that the pressure established within the evacuated container should be lower than that of the liquid desiccant (if a liquid desiccant is employed) at the temperature employed. Lower pressures and higher temperatures only serve to speed the process. In practice, using a thionyl chloride desiccant is has been found convenient to establish a vacuum of about 90% atmospheric, i.e., a pressure within the container of about 10% atmospheric—3-4 inches of mercury, and to start the process at room temperature and to gradually increase the temperature to or above the boiling point (at room temperature) of the thionyl chloride until dryness is achieved.

If a desiccant which is a solid compound at room temperature, e.g., $AlCl_3$ or $LiAlCl_3$, is used as the sole desiccant in an anhydrous solvent or as dissolved in a liquid desiccant, it may be desirable to soak the electrode in an anhydrous solvent (free of any solute) after completion of the vacuum treatment for the purpose of dissolving and removing residual solid desiccant from the electrode structure.

EXPERIMENTAL

A double D size extruded cathode that contained 50% $MnO_2$ and 50% carbon was prepared by extrusion according to the conventional procedure for forming regular carbon electrodes. The water content of this extruded electrode was determined by soaking it in 100 ml of an anhydrous solution of $LiAlCl_4$ in $SOCl_2$ (1.8 molar electrolyte) for 18 hours in a beaker. Infrared spectra were obtained for the dry electrolyte before its contact with the electrode (solid line) and the electrolyte after 18 hour contact with the electrode (dotted line). As seen in FIG. 1, a previously dry electrolyte (solid line) contains significant amount of water (point A in the dotted line) after contact with a conventional electrode. This water was previously bound in the manganese dioxide, presumably in its crystal structure.

Figure 2:
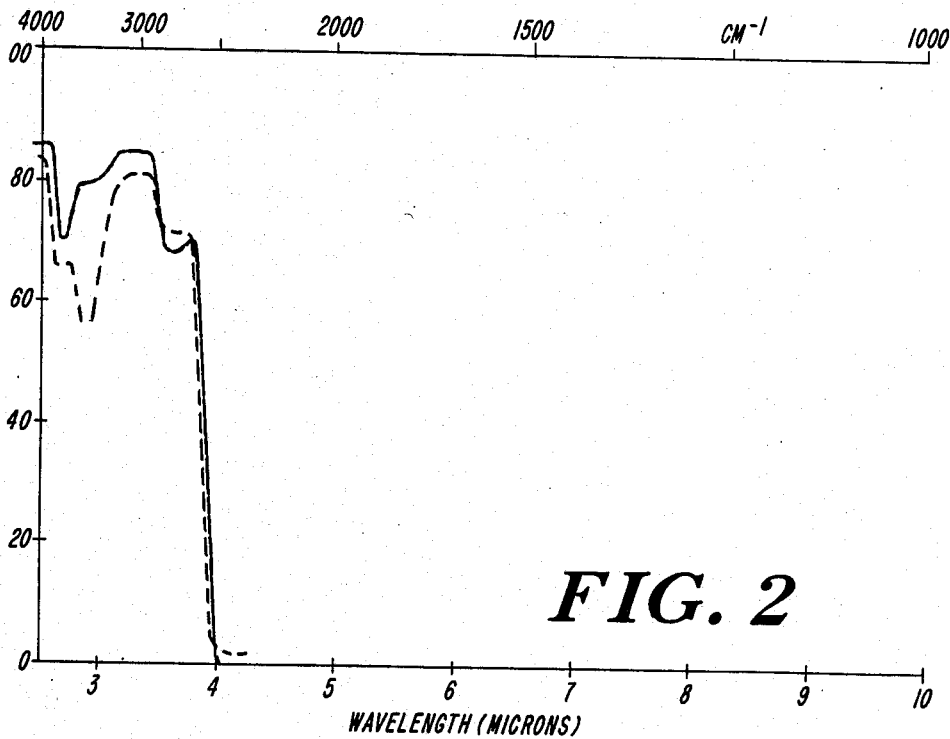
FIG. 2 shows infrared spectra for a conventional electrolyte before and after contact with manganese dioxide/carbon electrode which has previously been treated with the method of the present invention.

The electrode prepared and treated as described in the preceeding paragraph has minimal amounts of water left in it. This is illustrated in FIG. 2. The electrode was removed from its soaking bath of the electrolyte. The reaction products remaining in the porous structure of the electrode are removed from the electrode by vacuum according to the process of the present invention. The electrode is then placed in a second soaking bath containing 100 ml. of fresh 1.8 molar electrolyte. Infrared spectra of the dry electrolyte before its contact with the electrode (solid line) and after the contact (dotted line) reveals that little or no water is present in the electrolyte after contact with the manganese dioxide electrode prepared according to the process of the present invention. The water had been effectively removed by the reactive dehydration process.

Figure 3:
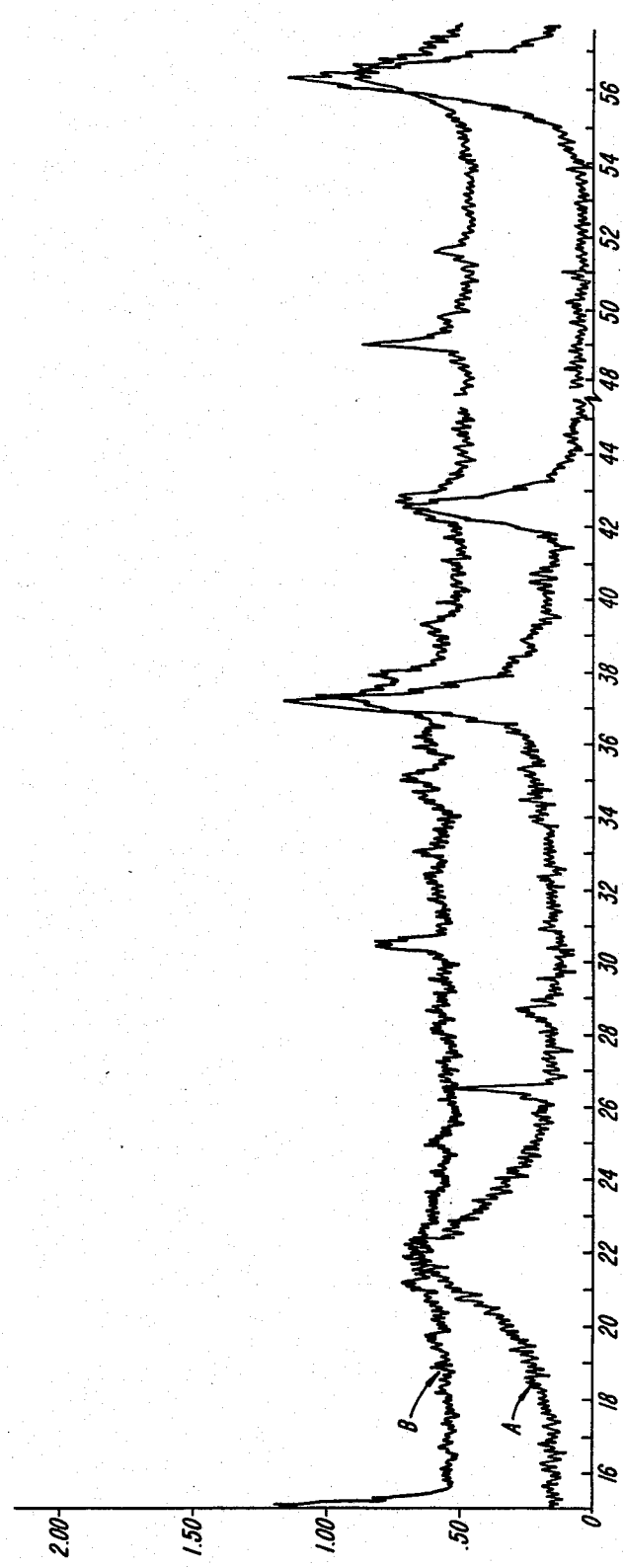
FIG. 3 shows X-ray diffraction spectra for a manganese dioxide/carbon electrode before and after contact with a conventional electrolyte as in the method of the present invention.

FIG. 3 is an X-ray diffraction pattern illustrating that the drying method of the present invention preserves the original crystal structure of manganese dioxide as it removes all bound water from it. In FIG. 3, curve "A" is the X-ray diffraction spectrum for a conventionally "dried" $MnO_2$/C electrode material and curve "B" is the X-ray diffraction spectrum for that same material dehydrated with 1.8 molar $LiAlCl_4$ in thionyl chloride in accordance with the present invention. These diffraction index analyses illustrate that the only change to the structure of the electrode material is the loss of the peak corresponding to water. Reading the analysis from left to right, it can be seen that the first peak, which corresponds to water, is missing from curve "B" which represents the manganese dioxide which has been dehydrated using the process of the present invention.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for reactive dehydration of manganese dioxide containing bound water comprising:
   (a) placing the manganese dioxide in an anhydrous fluid containing a dehydrating agent which reacts with the water bound in the manganese dioxide to form a reaction product that is extractable from the manganese dioxide;
   (b) removing the manganese dioxide from said fluid and placing the removed manganese dioxide in a hermetically sealable drying compartment connected to a vacuum source; and
   (c) establishing a vacuum within said compartment to pull off any remaining amount of said fluid and any volatile reaction product from said manganese dioxide.

2. A method in accordance with claim 1 wherein said fluid is an oxyhalide and said reaction product is a gas at room temperature.

3. A method in accordance with claim 2 wherein said fluid is thionyl chloride.

4. A method in accordance with claim 3 wherein said thionyl chloride contains a dissolved aluminum salt.

5. A method in accordance with claim 1 wherein said fluid is a solution of an aluminum salt in an anhydrous solvent.

6. A method in accordance with claim 5 additionally comprising immersing the manganese dioxide obtained in step (c) in a solvent for said aluminum salt and recovering said manganese dioxide from said solvent, said solvent being substantially free of solute prior to said immersion.

7. A method in accordance with claim 1 wherein said manganese dioxide is in the form of a shaped body suitable for use as the cathode in a lithium battery.

8. A method for preparing a water-free lithium-manganese dioxide battery comprising:
(a) assembling the battery comprising (A) lithium anode, (B) a cathode comprising carbon and manganese dioxide, and (C) a cell container;
(b) adding to said cell container a fluid containing a dehydrating agent which reacts with water bound to the manganese dioxide to form a reaction product that is extractable from the manganese dioxide;
(c) removing said fluid from said cell container;
(d) hermetically sealing and connecting said container to a vacuum source;
(e) establishing a vacuum within said compartment to pull off any remaining amount of said fluid and any volatile reaction product from said manganese dioxide;
(f) releasing the vacuum; and
(g) adding anhydrous electrolyte and heremetically sealing the cell.

9. A method in accordance with claim 8 wherein said fluid is an oxyhalide and said reaction product is a gas at room temperature.

10. A method in accordance with claim 9 wherein said fluid is thionyl chloride.

11. A method in accordance with claim 10 wherein said thionyl chloride contains a dissolved aluminum salt.

12. A method in accordance with claim 8 wherein said fluid is a solution of an aluminum salt in an anhydrous solvent.

* * * * *